US011176200B2

(12) United States Patent
Barber

(10) Patent No.: US 11,176,200 B2
(45) Date of Patent: *Nov. 16, 2021

(54) FAST COMPONENT ENUMERATION IN GRAPHS WITH IMPLICIT EDGES

(71) Applicant: Kount Inc., Boise, ID (US)

(72) Inventor: Timothy P. Barber, Boise, ID (US)

(73) Assignee: KOUNT INC., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/822,450

(22) Filed: Mar. 18, 2020

(65) Prior Publication Data

US 2020/0218763 A1 Jul. 9, 2020

Related U.S. Application Data

(63) Continuation of application No. 15/919,203, filed on Mar. 12, 2018, now Pat. No. 10,642,899, which is a continuation of application No. 14/728,499, filed on Jun. 2, 2015, now Pat. No. 9,916,393, which is a continuation of application No. 13/905,952, filed on May 30, 2013, now Pat. No. 9,075,896, which is a continuation of application No. 12/367,180, filed on Feb. 6, 2009, now Pat. No. 8,462,161.

(60) Provisional application No. 61/145,921, filed on Jan. 20, 2009.

(51) Int. Cl.
*G06F 16/901* (2019.01)
*G06T 11/20* (2006.01)

(52) U.S. Cl.
CPC ........ *G06F 16/9024* (2019.01); *G06T 11/206* (2013.01); *G06T 11/20* (2013.01); *G06T 11/203* (2013.01)

(58) Field of Classification Search
CPC .................................................. G06F 16/9024
USPC .......................................................... 345/440
See application file for complete search history.

(56) References Cited

U.S. PATENT DOCUMENTS

| 5,265,197 A | 11/1993 | Kondo |
| 5,502,646 A | 3/1996 | Chakradhar et al. |
| 5,825,369 A | 10/1998 | Rossignac et al. |

(Continued)

OTHER PUBLICATIONS

Heer, J. et al., "DOITrees Revisited: Scalable, Space-Constrained Visualization of Hierarchical Data," Advanced Visual Interfaces, 2004, pp. 421-424.

(Continued)

*Primary Examiner* — Javid A Amini
(74) *Attorney, Agent, or Firm* — Kilpatrick Townsend & Stockton LLP

(57) ABSTRACT

A method and system for graphical enumeration. The method includes creating an ordered set of vertices for a graph such that each vertex is associated with a corresponding index, and wherein each vertex in the ordered set of vertices includes information. A plurality of keys is created for defining the information. A plurality of lists of vertices is created, each of which is associated with a corresponding key such that vertices in a corresponding list include information associated with the corresponding key. For a first list of vertices, a least valued index is determined from a group of associated vertices based on vertices in the first list and vertices pointed to by the vertices in the first list. Also, all associated vertices are pointed to a root vertex associated with the least valued index.

20 Claims, 8 Drawing Sheets

(56) References Cited

U.S. PATENT DOCUMENTS

| | | | |
|---|---|---|---|
| 6,029,162 A * | 2/2000 | Schultz | G06F 16/2246 |
| 6,154,736 A * | 11/2000 | Chickering | G06N 7/005 |
| | | | 706/59 |
| 6,184,897 B1 | 2/2001 | Gueziec et al. | |
| 6,336,108 B1 | 1/2002 | Thiesson et al. | |
| 6,452,596 B1 | 9/2002 | Gueziec et al. | |
| 6,606,620 B1 | 8/2003 | Sundaresan et al. | |
| 6,633,579 B1 | 10/2003 | Tedijanto et al. | |
| 6,668,091 B1 | 12/2003 | Kim et al. | |
| 6,691,079 B1 | 2/2004 | Lai et al. | |
| 6,781,599 B2 | 8/2004 | Abello et al. | |
| 6,801,905 B2 | 10/2004 | Andrei | |
| 7,065,420 B1 | 6/2006 | Philpott et al. | |
| 7,120,904 B1 | 10/2006 | Robison | |
| 7,139,892 B2 | 11/2006 | Peinado et al. | |
| 7,143,091 B2 | 11/2006 | Charnock et al. | |
| 7,224,729 B1 | 5/2007 | Jang et al. | |
| 7,301,912 B2 | 11/2007 | Hong et al. | |
| 7,321,366 B2 | 1/2008 | Teshima et al. | |
| 7,420,952 B2 | 9/2008 | da Costa et al. | |
| 7,603,651 B2 | 10/2009 | De Brabander | |
| 7,605,816 B2 | 10/2009 | Peinado et al. | |
| 7,729,538 B2 | 6/2010 | Shilman et al. | |
| 7,933,915 B2 | 4/2011 | Singh et al. | |
| 8,321,841 B2 * | 11/2012 | Leung | G06Q 10/04 |
| | | | 717/126 |
| 8,396,884 B2 | 3/2013 | Singh et al. | |
| 8,429,108 B2 | 4/2013 | Eusterbrock | |
| 8,462,161 B1 | 6/2013 | Barber | |
| 9,075,896 B2 * | 7/2015 | Barber | G06F 16/9024 |
| 9,916,393 B2 * | 3/2018 | Barber | G06T 11/206 |
| 10,242,065 B1 * | 3/2019 | Starling | G06F 16/2246 |
| 10,642,899 B2 * | 5/2020 | Barber | G06T 11/206 |
| 2004/0030768 A1 | 2/2004 | Krishnamoorthy et al. | |
| 2004/0243982 A1 | 12/2004 | Robison | |
| 2004/0267747 A1 * | 12/2004 | Choi | G06F 16/1865 |
| 2005/0216238 A1 | 9/2005 | Teshima et al. | |
| 2006/0045337 A1 | 3/2006 | Shilman et al. | |
| 2006/0064432 A1 * | 3/2006 | Pettovello | G06F 16/81 |
| 2006/0075305 A1 | 4/2006 | Robinson et al. | |
| 2006/0253418 A1 * | 11/2006 | Charnock | G06F 16/34 |
| 2006/0265557 A1 | 11/2006 | Peinado et al. | |
| 2007/0011669 A1 | 1/2007 | Varma et al. | |
| 2007/0212719 A1 | 9/2007 | Hlavacek et al. | |
| 2007/0239694 A1 | 10/2007 | Singh et al. | |
| 2007/0250500 A1 | 10/2007 | Ismalon | |
| 2007/0298805 A1 | 12/2007 | Basak et al. | |
| 2008/0300834 A1 | 12/2008 | Wiemer et al. | |
| 2009/0043489 A1 | 2/2009 | Weidner | |
| 2009/0216820 A1 * | 8/2009 | Eusterbrock | G06F 17/10 |
| | | | 708/270 |
| 2010/0214313 A1 | 8/2010 | Herman et al. | |
| 2010/0281166 A1 | 11/2010 | Buyya et al. | |
| 2011/0173189 A1 | 7/2011 | Singh et al. | |
| 2014/0279797 A1 | 9/2014 | Dang et al. | |
| 2016/0378831 A1 | 12/2016 | Infante-Lopez | |

OTHER PUBLICATIONS

Katoh, N. et al., "Fast Enumeration Algorithms for Non-crossing Geometric Graphs," SCG '08, Jun. 2008, pp. 328-337.

Liu, H. et al., "A New Way to Enumerate Cycles in Graph," Proceedings of the Advanced International Conference on Telecommunications and International Conference on Internet and Web Applications and Services, 2006, three pages.

Robinson, E. et al., "A Comparative Analysis of Parallel Disk-Based Methods for Enumerating Implicit Graphs," PASCO'07, Jul. 27-28, 2007, pp. 78-87.

Rubin, F., "Enumerating All Simple Paths in a Graph," IEEE, 1978, pp. 641-642.

Sarad, S., "A Time and Memory Efficient Way to Enumerate Cycles in a Graph," International Conference on Intelligent and Advanced Systems, 2007, pp. 498-500.

Vis, T., "Enumeration of Unlabeled Graphs," May 1, 2007, five pages.

Wagner, S., "Graph-Theoretical Enumeration and Digital Expansions: an Analytic Approach," Feb. 2006, 105 pages.

United States Advisory Action, U.S. Appl. No. 14/728,499, dated Oct. 4, 2017, three pages.

United States Office Action, U.S. Appl. No. 14/728,499, dated Apr. 27, 2017, seven pages.

United States Office Action, U.S. Appl. No. 14/728,499, dated Oct. 25, 2016, seven pages.

United States Office Action, U.S. Appl. No. 13/905,952, dated Aug. 22, 2014, 10 pages.

United States Office Action, U.S. Appl. No. 12/367,180, dated Aug. 13, 2012, 12 pages.

United States Office Action, U.S. Appl. No. 12/367,180, dated Feb. 1, 2012, 12 pages.

United States Office Action, U.S. Appl. No. 15/919,203, dated Jul. 30, 2019, 16 pages.

United States Office Action, U.S. Appl. No. 15/919,203, dated Mar. 14, 2019, 14 pages.

* cited by examiner

| VERTEX # (551) | ROOT VERTEX (552) |
|---|---|
| V - 1 | V - 1 |
| V - 2 | --- |
| V - 3 | V - 3 |

| V - N | --- |

| COMPONENT # (561) | Transaction # (562) | Transaction # (563) |
|---|---|---|
| C - 1  (571) | V - 1 | V - 15 |
| C - 2  (572) | V - 2 | --- |

| C - XX  (573) | V - XX | V - 900 |

FAST COMPONENT ENUMERATION IN GRAPHS WITH IMPLICIT EDGES

CROSS REFERENCE TO RELATED APPLICATIONS

This application is a continuation of U.S. application Ser. No. 15/919,203 filed on Mar. 12, 2018, which is a continuation of U.S. application Ser. No. 14/728,499 filed on Jun. 2, 2015, which is a continuation of U.S. application Ser. No. 13/905,952, filed on May 30, 2013, which is a continuation of U.S. application Ser. No. 12/367,180, filed on Feb. 6, 2009, which claims the benefit of U.S. Provisional Application No. 61/145,921, filed on Jan. 20, 2009, each of which is incorporated by reference in its entirety.

BACKGROUND

The present invention pertains to the field of data storage. Specifically, the present invention provides for the enumeration of components in a graph without explicitly defining the edges in the graph.

A graph is a collection of "vertices" (points or nodes) and "edges" (lines connecting points). The graph can be representative of any set of data, such as those related to travel, biological samples, and chip design, to name a few. Points in the graph represent an individual collection of data, and edges between two points can represent data that is shared between the two points. For instance, in the travel industry a graph may represent a grid of airline flights between numerous cities regardless of which airline is used. Each node in the graph can represent a city to which a flight is possibly directed. In one case, connected points form an edge and are related in that those two points share the same flight. As another edge, the connected points may represent a flight between two cities for a particular airline.

In conventional techniques, a graph is typically represented in memory as a list of all pairs of vertices that share an edge. In addition, a "connected component" of a graph is any subset of vertices all connected by some sequence of edges. Enumerating the connected components of a graph is a problem in classical computer science. Traditional methods include Kosaraju's algorithm, Tarjan's algorithm, and Gabow's algorithm.

However, for each of these techniques enumerating connected components, execution time and space in memory are proportional to the total number of vertices and edges, or O(V+E). In more simplistic terms, the entire graph and all the edges in the graphs need to be evaluated in order to enumerate the connected components. While this may seem like a straightforward technique, as the number of points in the graph increases, the time to enumerate the graph also increases. For graphs that include points that are heavily connected, the execution time may increase to the square of the number of points in the graph. As such, for large amounts of data, traditional techniques for component enumeration fall short of providing real-time analysis of the graphical data.

SUMMARY

What is needed is an invention that provides a faster and more efficient way to enumerate graphs. What is described in the present invention is a method and system for enumerating graphs, and in particular for enumerating components of a graph for purposes of associating vertices in the graph to provide data analysis.

A method for graphical enumeration is described, in accordance with one embodiment of the present invention. The method is used to process information related to any type of data, such as customer transactions. The information can be represented as a graph. The method includes creating an ordered set of vertices for a graph such that each vertex is associated with a corresponding index. Each vertex in the ordered set of vertices includes a subset of the information, such as one customer transaction. A plurality of keys is created that define the information. Each key is associated with a unique piece of information. A plurality of lists of vertices is created, each of which is associated with a corresponding key, such that vertices in a corresponding list include information associated with the corresponding key. For a first list of vertices, a least valued index is determined from a group of associated vertices based on vertices in the first list and vertices pointed to by the vertices in the first list. Also, all associated vertices are pointed to a root vertex associated with the least valued index.

In another embodiment, a system for performing graphical enumeration is described. The system can be implemented in conjunction with a communication network that is coupled to a plurality of information sources. For instance, the system is used to perform graphical enumeration on customer transactions that are associated with the plurality of information sources. The system includes a receiver for receiving information related to at least one consumer transaction from at least one computing resource at a corresponding source. For instance, the corresponding source may be a merchant participating in the transaction, a credit card processing company, a consumer initiating the transaction, or the like. A graph definer is included in the system for creating an ordered set of vertices for the graph, such that each vertex is associated with a corresponding index. The ordered set of vertices includes the information that is received. Storage is included in the system for storing the ordered set of vertices. In addition, the system includes a key creator for creating a plurality of keys defining the information. A list creator creates a plurality of lists of vertices by accessing the ordered set of vertices that is stored. Each of the lists of vertices is associated with a corresponding key, such that a vertex in a corresponding list includes information associated with the corresponding key. The system also includes a component generator for enumerating the graph. The component generator determines a least valued index from a group of associated vertices based on vertices in the first list and vertices pointed to by the vertices in the first list. Also, the component generator points all associated vertices to a root vertex associated with the least valued index.

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

FIG. 5C is an illustration of a look up table providing relationships between a vertex and a corresponding root vertex, in accordance with one embodiment of the present invention.

FIG. 5D is an illustration of a look up table providing relationships between a component of a graph and its family of vertices, in accordance with one embodiment of the present invention.

DETAILED DESCRIPTION OF THE PREFERRED EMBODIMENTS

Figure 1:
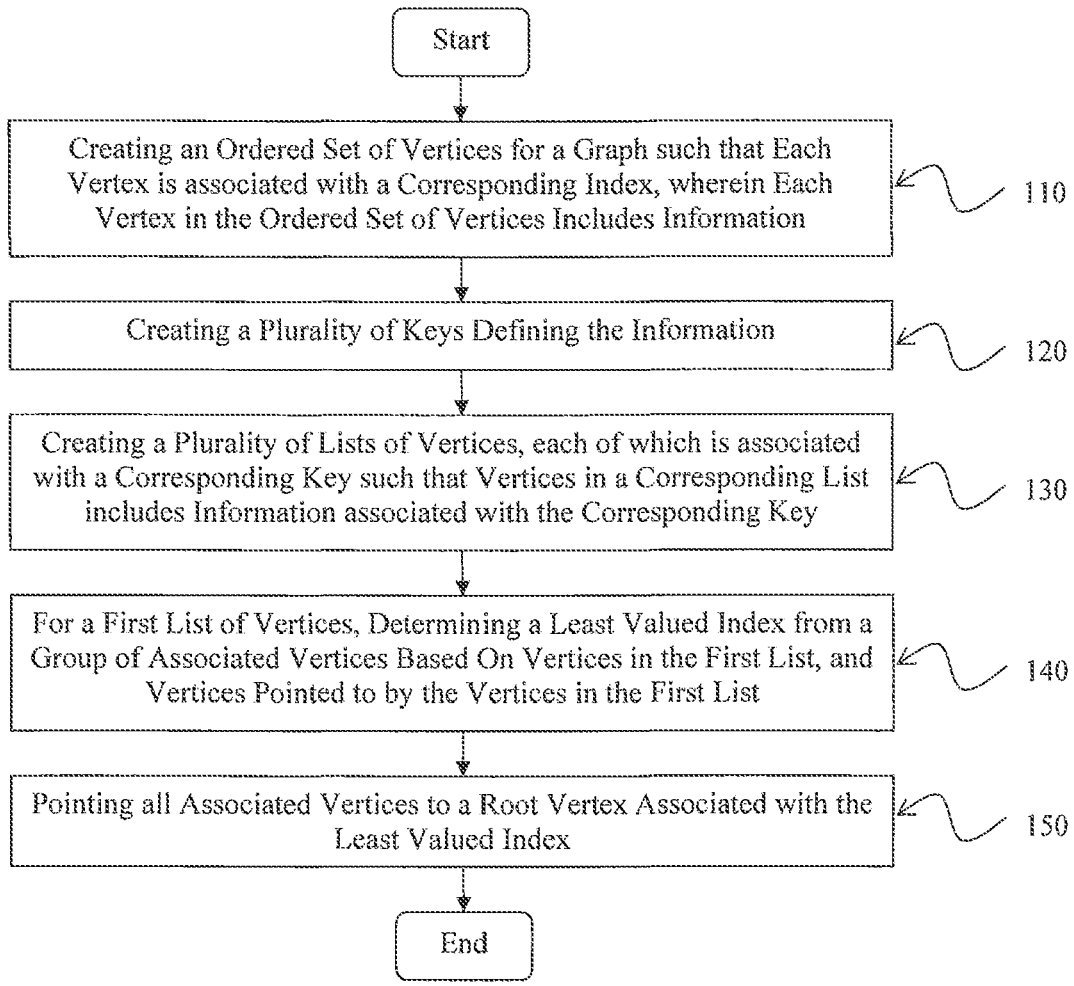
FIG. 1 is a flow diagram illustrating a method for performing fast enumeration of components in a graph, in accordance with one embodiment of the present invention.

Reference will now be made in detail to the preferred embodiments of the present invention, a method and system for enumerating components in a graph. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Accordingly, embodiments of the present invention are capable of providing a faster and more efficient way to enumerate components of a graph in order to find associations between vertices. In particular, the present invention is capable of avoiding edge analysis when enumerating a graph through the creation of keys and making other various associations. As such, embodiments of the present invention need not perform an explicit analysis of each edge in a graph when enumerating components of a graph.

Notation and Nomenclature

Embodiments of the present invention can be implemented on a software program or dedicated hardware for processing data through a computer system. The computer system can be a personal computer, notebook computer, server computer, mainframe, networked computer (e.g., router), handheld computer, personal digital assistant, workstation, and the like. This program or its corresponding hardware implementation is operable for fast enumeration of components of a graph without explicit edge analysis. In one embodiment, the computer system includes a processor coupled to a bus and memory storage coupled to the bus. The memory storage can be volatile or non-volatile and can include removable storage media. The computer can also include a display, provision for data input and output, etc.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "creating," "defining," or the like refer to the actions and processes of a computer system, or similar electronic computing device, including an embedded system, that manipulates and transfers data represented as physical (electronic) quantities within the computer system's registers and memories into other data similarly represented as physical quantities within the computer system memories or registers or other such information storage, transmission or display devices.

Graph Analysis

Graph theory is used to represent data of various types. The data is represented as objects in a graph, where "vertices" represent the data objects and "edges" are links that connect pairs of vertices. As such, a graph is a collection of vertices (nodes or points) and edges (lines connecting two points). Points in the graph represent an individual collection of data, and edges between two points can represent data that is shared between the two points.

Conventionally, a graph can be represented in memory as a list of all pairs of vertices that share an edge. In addition, the graph can be represented by vertices that do not share an edge with another vertex. In addition, a "connected component" of a graph is any subset of vertices, each of which is connected to one or more vertices in the connected component by some sequence of edges. Embodiments of the present invention are able to perform enumeration of components of a graph without explicitly identifying edges within the graph.

A graph can represent a variety of data. As examples, graph theory is employed to represent data objects in transportation, Internet structure, communication traffic networks, airline travel networks, computer chip design, physics, biology, etc. For instance, a graph can represent employees in a large international company and identify specifically where an employee works, at what position, earning what salary, etc. As another example, graph theory can be employed to represent structural properties of an air transportation network. The graph may represent a grid of airline flights between numerous airports, and include information such as the locations of airports, specific flights between airports, associated airlines, flight times, etc. Also, graph theory is employed to represent a molecular structure, or to represent three-dimensional atomic structures of an atom.

One particular implementation of embodiments of the present invention is used to model behavior, and more specifically is used to perform risk analysis of consumer behavior within the context of making retail purchases. In one instance, risk analysis of a graph is used to prevent fraud. For instance, transaction orders that use the same credit card number, email address, hypertext transfer protocol (HTTP) cookie, machine fingerprint, Internet protocol (IP) address, or any of a number of factors, may be related. In the case of fraud analysis, an online retail customer with one email address and twenty credit card numbers may be in possession and using a list of stolen credit cards.

Fast Component Enumeration of Graphs

Conventionally a graph is represented in memory as either a list of all pairs of vertices that share an edge. Suppose instead of explicitly defining edges, a graph of embodiments of the present invention is represented as a list of single vertices, each associated with a list of "keys". Also suppose that there is no explicit list of edges, but implicitly embodiments of the present invention make the implication that two vertices share an edge if they share a common key value. For this special case, component enumeration of embodiments of the present invention requires an execution time that is at worst represented by $O(V \cdot \log V)$ and requires a memory space approximating $O(V)$, where O is the execution time and V is the number of vertices. In practice this represents a substantial savings over the previously described execution time of traditional methods $O(V+E)$, since in graphs with heavily connected components $O(V+E)$ approaches $O(V^2)$.

FIG. 1 is a flow diagram 100 illustrating a method for fast enumeration of components of graphs, in accordance with one embodiment of the present invention. The process outlined in flow diagram 100 is used to reduce data presented in the form of graphs into their various components. More particularly, throughout the process, the resulting components form spanning trees that degenerate down to one, where from each vertex, there is one edge to the root vertex.

At 110, an ordered set of vertices for a graph is created. Each vertex in the graph is associated with a corresponding index. For instance, the index may follow canonical form, such as a numbering system. In one example, each vertex represents a consumer transaction and is ordered with some relation to time, such as when the transaction occurred, when the transaction was received, when the transaction completed processing, etc. Further, each vertex in the ordered set of vertices includes information that defines that transaction. The information may be unique to a vertex, or may be shared by one or more vertices. For instance, in a retail environment, a single credit card may be used in numerous transactions. As such, vertices relating to those transactions are linked in the graph through the credit card.

At 120, a plurality of keys is created that define the information. In particular, each key defines a unique piece of information. For instance, in the retail environment, information related to consumer transactions may include credit card information, HTTP cookies associated with the computing resource used to complete the transaction from the buyer's side, IP address of the computing resource used to access the Internet, email address of the buyer, etc. Each of these pieces of information is associated with a different key. The total number of keys is constantly changing as new information is received, and less useful information expires. For instance, each credit card number used in a transaction is unique and is associated with a unique key.

At 130, a plurality of lists of vertices is created. More particularly, for each key, a corresponding list of vertices is created, such that vertices in the corresponding list include information that is associated with the corresponding key. For example, a credit card may be used in numerous transactions. Each of those transactions is represented by a different vertex in the graph representing all known consumer transactions. For the key associated with the credit card, a list is created of vertices that include the same credit card. That is, the list includes vertices associated with transactions that have used the same credit card.

At 140, for a first list of vertices, a least valued index is determined from a group of associated vertices. The group of associated vertices is based on vertices in the first list, and also vertices pointed to by the vertices in the first list. In one case, the group includes the vertices in the first list, and also vertices pointed to by the vertices in the first list. More particularly, as the process in flow diagram 100 is performed, each vertex in the graph will point downhill to another vertex, within the context of the ordered set of vertices. Root vertices do not point downhill, but form the endpoint of link between vertices. Eventually, each vertex will point downhill to a root vertex in a corresponding component of the graph. The least valued index is associated with a vertex in the graph.

In addition, the group of associated vertices includes a vertex or chain of vertices that is pointed to by a list vertex that is associated with the least valued index from vertices in the first list and vertices pointed to by the vertices in the first list. That is, an additional check is made to determine if the list vertex points to another vertex, and so on in a chain of pointed to vertices. If so, the least valued index is adjusted to the lowest index in the chain of pointed to vertices.

At 150, all associated vertices are pointed to a root vertex associated with the least valued index. This pointing operation links the associated vertices to other vertices in the graph. More particularly, each of the associated vertices is updated, such that they all point to the most current root vertex. Since they point to their most current root vertex, as the operations in 140 and 150 are repeated for each of the plurality of lists of vertices, vertices in the graph will continually update their corresponding pointed to vertex. In particular, for a second list of vertices, a least valued index is determined from a group of associated vertices. The group of associated vertices includes vertices in the second list, and also vertices pointed to by the vertices in the second list. Also, all of these associated vertices are pointed to a second root vertex that is most current, associated with the least valued index. Eventually each vertex in the ordered set of vertices of the graph will point to a root vertex that is the true root of a component of the graph.

In one application, as previously described component enumeration of a graph is performed as part of a risk analysis of consumer behavior, such as retail purchases. Orders that use the same credit card number, email address, http cookie, machine fingerprint, IP address, or other factor, may be related. In practice, it can be useful to assemble groups of such orders for further analysis, such as when performing fraud analysis. Embodiments of the present invention are described within the context of risk analysis of consumer behavior, for illustration purposes. However, other embodiments are well suited to component enumeration of graphs representing any type of data for purposes of any type of data analysis. That is, methods and systems of the present invention are well suited to performing component enumeration on any graph representing any type of data in a quick and efficient manner.

Figure 2:
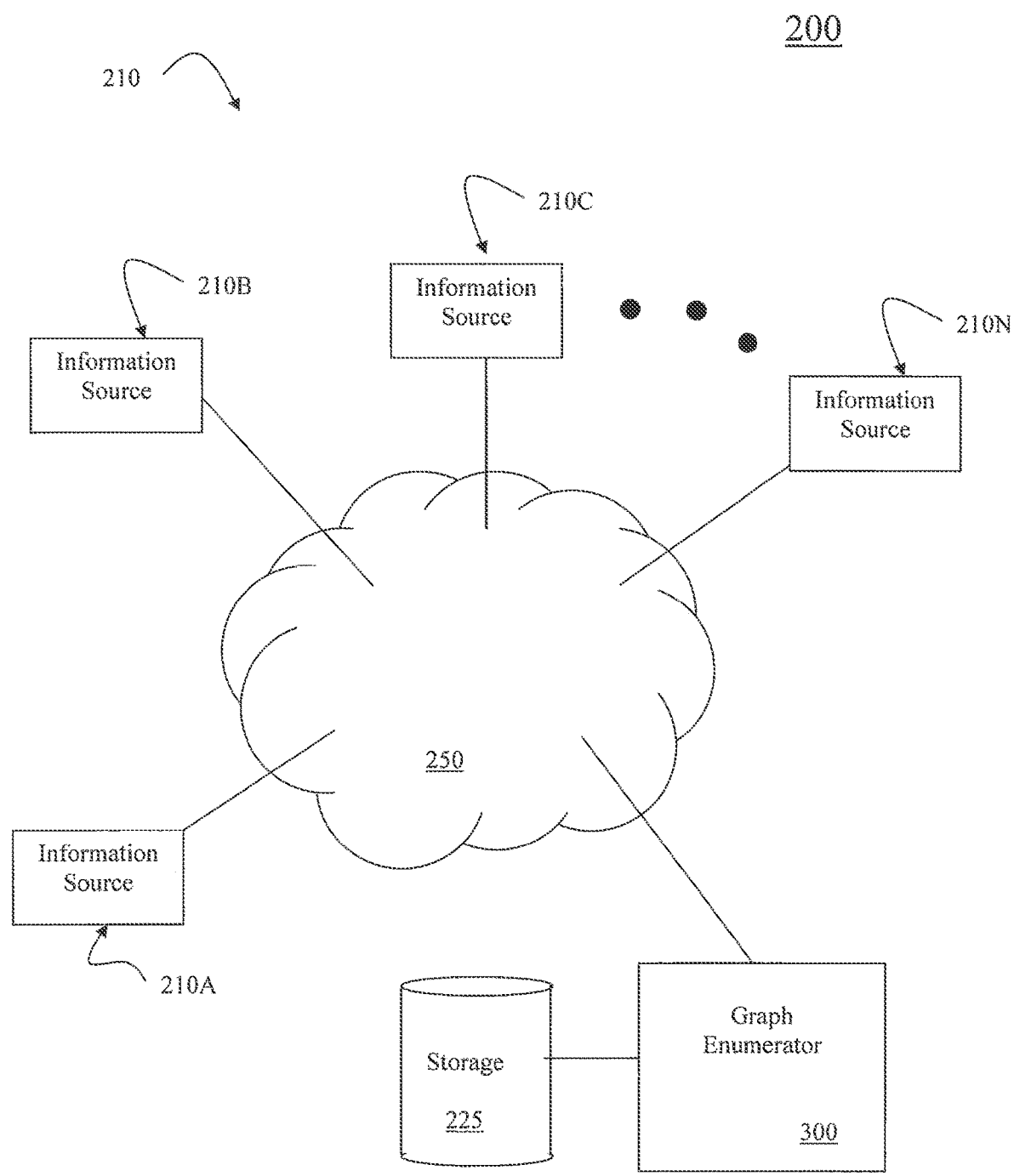
FIG. 2 is a diagram of a communication network that includes a system that is capable of fast enumeration of components in a graph, in accordance with one embodiment of the present invention.

FIG. 2 is an illustration of a communication system 200 that is capable of performing component enumeration of graphs in a quick and efficient manner, in accordance with one embodiment of the present invention. Specifically, as shown in FIG. 2, communication system 200 is capable of supporting risk analysis of consumer behavior, such as behavior related to making consumer transactions for retail purchases. That is, an Internet based service is able to collect information related to consumer transactions, represent the information in graph form, and analyze the information, in part by enumerating components of the graph.

As shown in FIG. 2, a plurality of information sources 210 accesses the Internet 250, each through a corresponding network device (e.g., router) in order to pass on information to the graph enumerator 300. The Internet 250 is a collection of communicatively coupled routers, servers and browsers associated with a client's computing resource that allow for the transfer of content (e.g., data, information on consumer transactions, files, etc.) between the plurality of information sources 210 and the graph enumerator 300. Ever evolving services as implemented through the Internet provide for the communication of information for business, education, work, private, and social purposes. For example, a fraud detection service, as implemented through the graph enumerator 300 may implement the methods and systems for fast component enumeration of the present invention as provided by an Internet based service.

Each of the information sources (e.g., 210A-N) provides information related to a consumer transaction or order, such as those making retail purchases. For instance, a consumer transaction may involve a buyer and a merchant (e.g., seller). The transaction between the buyer and merchant may occur over the Internet as a form of electronic commerce (e-commerce), or may be implemented through more traditional means, such as through a person-to person transaction at a brick-and-mortar merchant. Information related to the consumer transaction is collected at a corresponding information source. The source may be associated with either the buyer, the merchant, or a third party service. As an example, in an e-commerce setting, the buyer's computer resource may collect the information related to the consumer transaction and relay that information to the graph enumerator 300. Also, in either the e-commerce setting or a more traditional market setting, a merchant may collect the information related to one or more transactions and send them to the graph enumerator 300. Further, in either the e-commerce setting or the more traditional market setting, a third party service, such as a credit card company or credit card processing company, may collect the information and send it to the graph enumerator 300 for further analysis.

For example, the information relating to a current transaction may be linked to other consumer transactions. As described previously, as the information is incorporated into a graph representing a plurality of consumer transactions, graph enumeration determines whether the current transaction may be linked to other consumer transactions. The relationship of the current transaction to other previous transactions is useful in performing fraud analysis, as an example. As such, the current transaction may be halted if fraud is detected, or may be authorized to complete the credit card transaction, if no fraud is detected. In addition, future transactions involving the same information (e.g., credit card, machine ID, email address, etc.) may be halted if fraud is detected.

The graph enumerator 300 of FIG. 2 is a system that performs graphical enumeration, and more specifically is capable of performing component enumeration of a graph, in accordance with one embodiment of the present invention. The graph enumerator 300 includes means for creating an ordered set of vertices for a graph such that each vertex is associated with a corresponding index, and wherein each vertex in the ordered set of vertices includes information (e.g., information related to consumer transactions). The graph enumerator also includes means for creating a plurality of keys that define the information. Also, the graph enumerator 300 includes means for creating a plurality of lists of vertices, each of which is associated with a corresponding key such that vertices in a corresponding list includes information associated with the corresponding key. Further, the graph enumerator 300 includes means for determining a least valued index from a group of associated vertices based on vertices in a first list of vertices associated with a corresponding key, and vertices pointed to by vertices in the first list. The graph enumerator 300 also includes means for pointing all associated vertices to a root vertex, that is most current, and associated with the least valued index.

Figure 3:
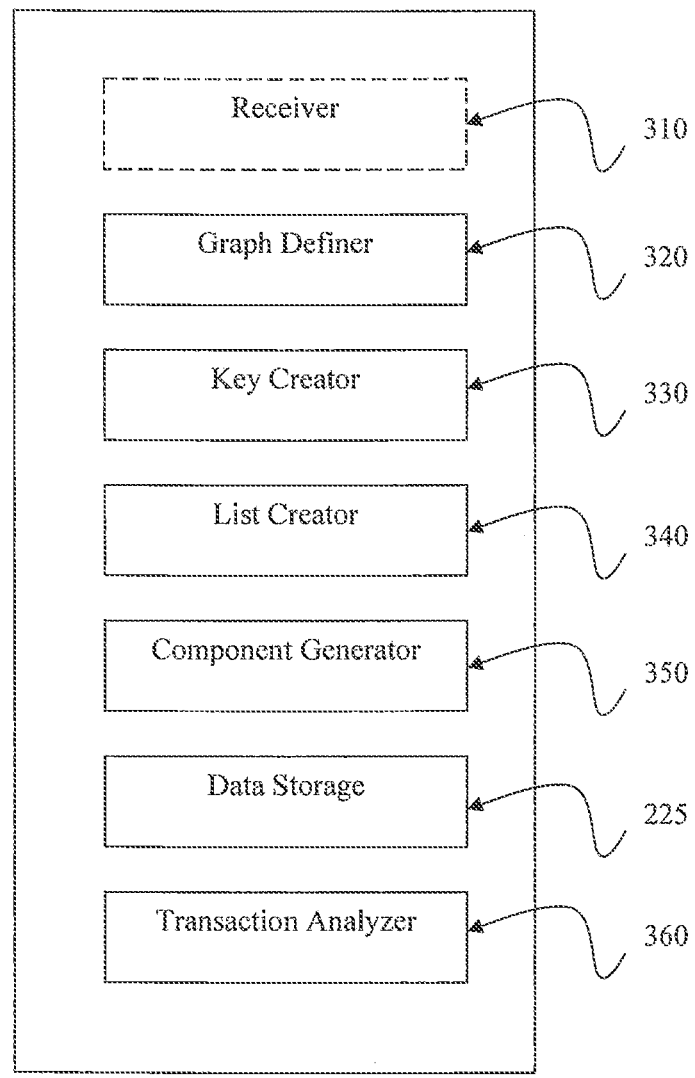
FIG. 3 is a system that is capable of fast enumeration of components in a graph, in accordance with one embodiment of the present invention.
Figure 4:
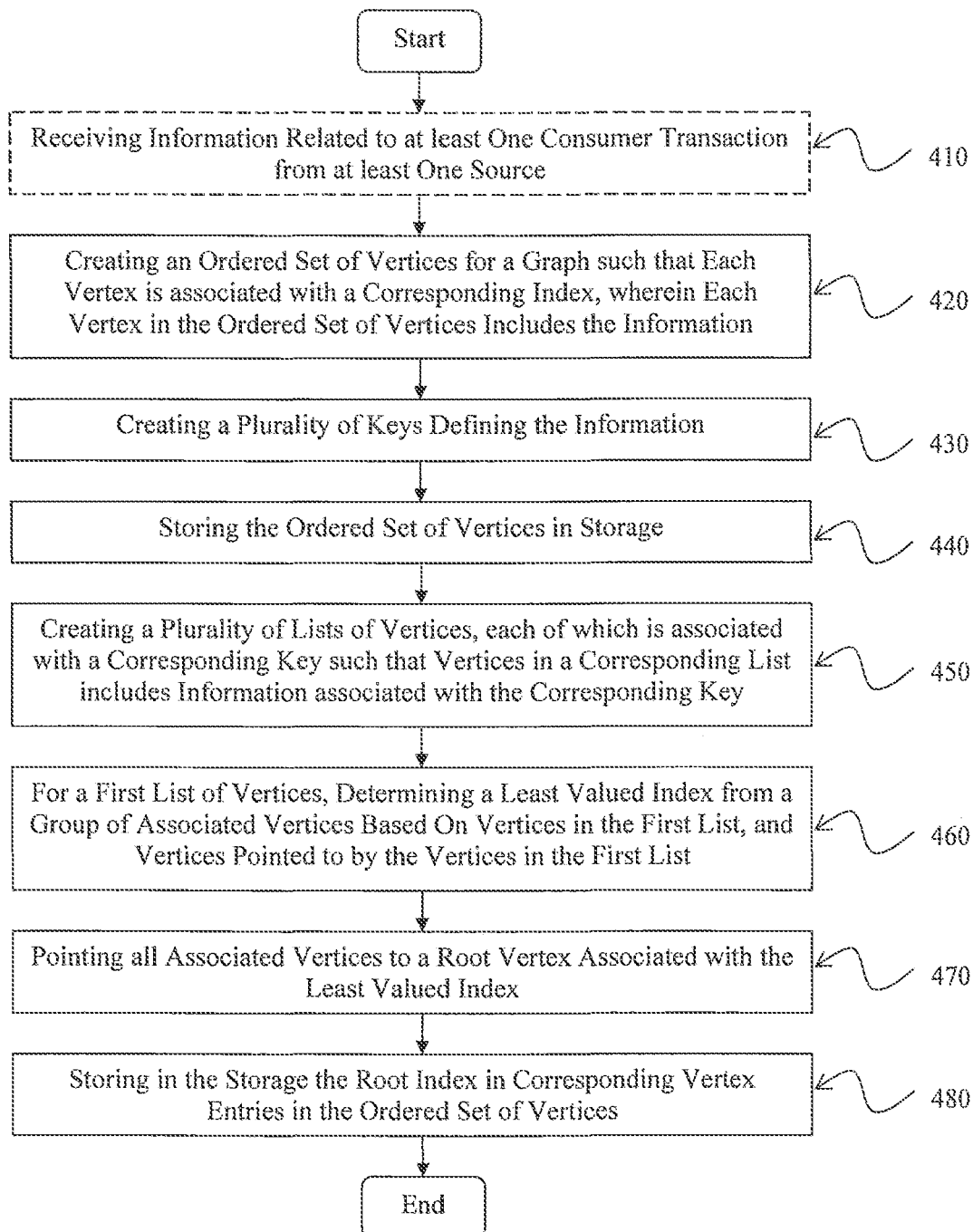
FIG. 4 is a flow diagram illustrating in more detail a method for performing fast enumeration of components in a graph, in accordance with one embodiment of the present invention.

FIGS. 3 and 4 in combination illustrate a system and method for performing fast component enumeration of a graph, in accordance with embodiments of the present invention. In particular, FIG. 3 illustrates the graph enumerator 300, first introduced in FIG. 2, that is capable of implementing the method outlined in FIG. 4 for component enumeration of a graph. The system and method of FIGS. 3 and 4 can be implemented within communication network or system 100 of FIG. 1.

In general, the graph enumerator 300 includes an optional receiver 310, graph definer 320, key creator 330, list creator 340, component generator 350, data storage 225, and optional transaction analyzer 360. In one implementation, receiver 310 receives information related to at least one consumer transaction from at least one source. In another implementation, receiver 310 is an input mechanism for receiving information into system 300. Graph definer 320 creates an ordered set of vertices for a graph such that each vertex is associated with a corresponding index. The ordered set of vertices includes the information related to at least one consumer transaction. Key creator 330 creates a plurality of keys defining the information. List creator 340 creates a plurality of lists of vertices, each of which is associated with a corresponding key such that vertices in a corresponding list includes information associated with the corresponding key. Component generator 350 determines a least valued index from a group of associated vertices based on vertices in a first list of vertices, and vertices pointed to by the vertices in said first list. Component generator 350 also points all associated vertices to a most current root vertex that is associated with the least valued index. Data storage 225 may be incorporated within graph enumerator 300, or located remotely from graph enumerator 300, and is used for storing the ordered set of vertices, and storing a root index associated with a most current root vertex in corresponding entries of the ordered set of vertices. Also, storage 225 is capable of storing, in relation to a component, vertices that are associated with the component, such that vertices that point to the same root vertex are associated with a corresponding component of the graph. The functions performed by graph enumerator 300 are described in more detail in association with FIG. 4.

Turning now to FIG. 4, a method for component enumeration for graphs including information related to consumer transactions is illustrated in flow diagram 400, in accordance with one embodiment of the present invention. The method of FIG. 4 is analogous to the method outlined in flow diagram 100 of FIG. 1, in one embodiment, but provides more detail into the transfer and transformation of information related to a graph. In addition, the method of FIG. 4 is implementable by the graph enumerator 300 of FIG. 3, and implementable within the communication system or network 200 of FIG. 2.

At 410, optionally, information is received for processing. For instance, the information is received by receiver 310 of graph enumerator 300 from one or more sources 210A-N. More specifically, in one implementation the information is received from a source (e.g., merchant machine, buyer machine, third party machine, such as a credit card processing company, etc.). The information may be received over the Internet, or through some communication network, so that the information may be analyzed in relation to previous consumer transactions, with results returned to a requestor in a timely fashion. In another instance, the information is received through other means, such that receiver 310 acts as an input mechanism. Still other means for receiving data is supported. While the present embodiment is described within the context of receiving information related to consumer transactions, the method of flow diagram 400 is well suited to component enumeration of any graph representing any type of data that is received for analysis.

At 420, an ordered set of vertices for a graph is created. For instance, the graph definer 320 is capable of creating the ordered set of vertices. Each vertex in the graph is associated with a corresponding index. The operation outlined in 420 is analogous to the operation outlined in 110, and the description of 110 previously provided is equally suited to the operation of 420. In particular, each vertex includes information, such as those related to consumer transactions (e.g., credit card number, IP address, etc.).

At 430, a plurality of keys is created that define the information. For instance, the key creator 330 is capable of creating the keys. The operation outlined in 430 is analogous to the operation outlined in 120, and the description of 120 previously provided is equally suited to describing 430. In particular, each key defines a unique piece of information associated with one or more vertices. As described before, the information related to consumer transactions may include credit card information, HTTP cookies associated with the computing resource used to complete the transaction from the buyer's side, IP address of the computing resource, email address of the buyer, etc.

At 440, the ordered set of vertices is stored in storage. For instance, graph definer 320 stores the ordered set of vertices in storage 225. As such, as each set of information (e.g., information related to a single and new consumer transaction) is received, graph definer 320 parses out the information and stores that information in relation to a corresponding vertex in the ordered set of vertices. More particularly, the ordered vertices are stored in storage 225, such that information and their relationship to the keys are stored for ready access. As such, as the ordered set of vertices gets updated through the addition and deletion of vertices, a complete set of vertices is available for access in order to perform component enumeration of the representative graph.

Figure 5A:
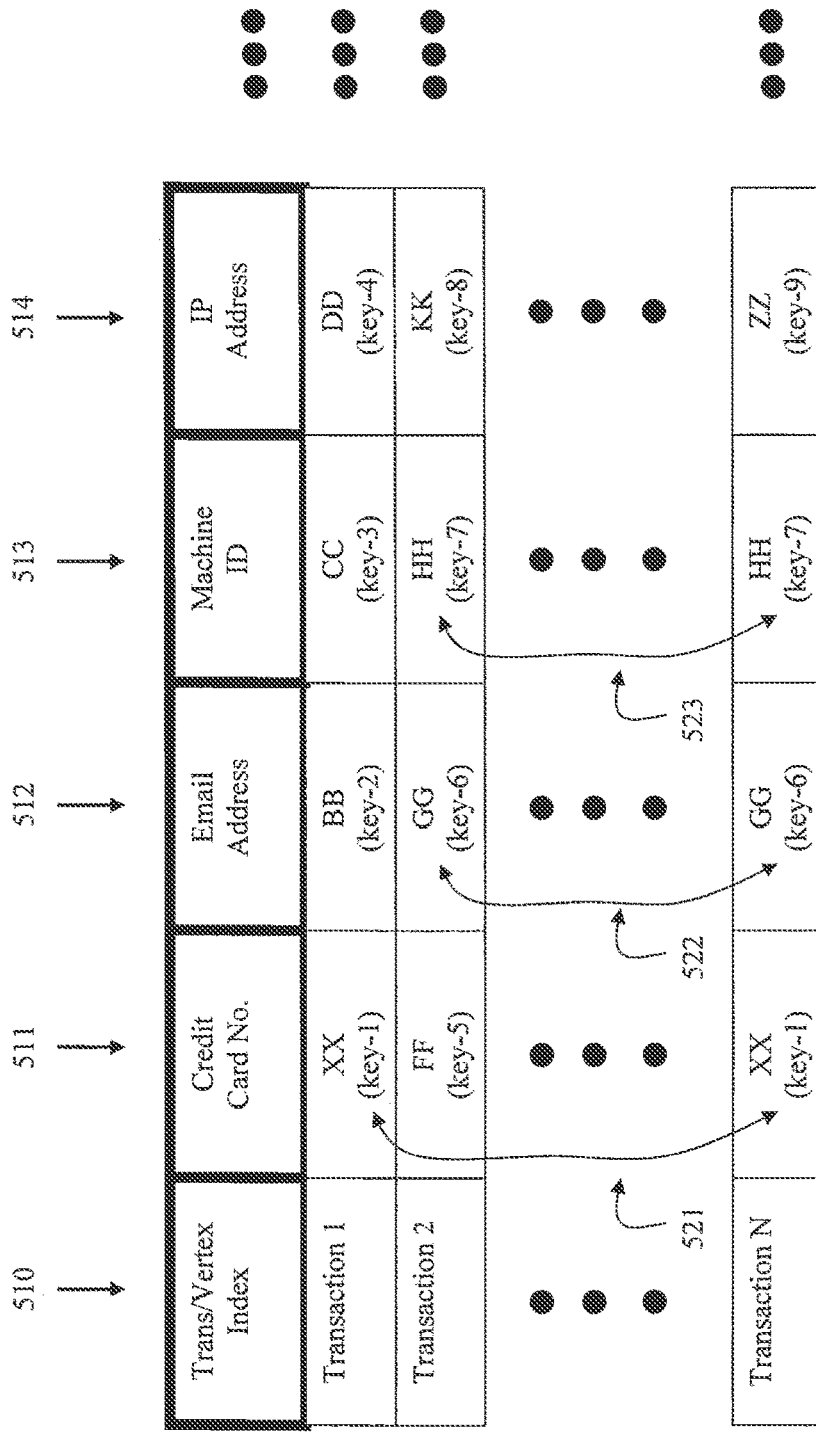
FIG. 5A is an illustration of a table representation of a graph including information related to customer transactions, in accordance with one embodiment of the present invention.

For illustration purposes only, FIG. 5A shows table 500A that is a representation of the ordered set of vertices in a graph, in accordance with one embodiment of the present invention. As shown in 500A, the vertices include information related to customer transactions. As generally described for graphs representing consumer transactions, each transaction attempt is represented as a row in a database table (a vertex). Each row includes a list of data elements (keys) associated with the transaction. Each group of vertices connected by some sequence of edges is a connected component of the larger graph. In embodiments of the present invention, each vertex is rapidly labeled with a number representing the component to which it belongs when implementing the method of FIG. 4.

For instance, column 510 provides the index number in the ordered set of vertices representing transaction attempts. These are ordered as transactions 1-N, and can represent any ordering scheme, such as an ordering by time (e.g., time transaction received). The remaining columns providing information related to each of the vertices, in the form of keys. As explained above, the keys implicitly define edges, such that any two vertices that share a key also implicitly share an edge. For instance, as shown in table 500A, column 511 provides a credit card number, column 512 provides an email address, column 513 provides machine identifying information (e.g., unique ID identifying the computing resource used by the consumer to make the transaction), column 514 provides the IP address of the computing resource used by the consumer, etc.

It is important to note that table 500A is an illustration of the ordered set of vertices, and as such, the ordered set of vertices may be arranged in any number of other ways or configurations. As shown in table 500A, information common to consumer transactions are included in the columns, and are relevant when trying to group transaction together for purposes of further analysis. The information need not be presented by column, and can be presented in random fashion. For instance, a transaction could list relevant information in random order, as long as a reference to the corresponding key is made.

As shown in FIG. 5A, each transaction includes various types of information and their association with a corresponding key. For instance, for transaction 1, the credit card number is XX and is assigned to key-1; a given email address is BB and is assigned to key-2, a machine ID is CC and is assigned to key-3, and an IP address is DD and is assigned to key-4. Additional information may be provided. Also, not all the information in each of the columns need be reported for each transaction. Similarly, information is collected and stored for transactions 2-N.

Importantly, information maybe commonly shared between different transactions. For instance, as shown by curved line 521 the credit card number XX assigned to key-1 is used in transactions 1 and N. As such, transactions 1 and N are related or linked by the credit card number XX. In addition, as shown by line 522, transactions 2 and N are linked by the common email address GG assigned to key-6. Further, as shown by line 523, transactions 2 and N are linked by common machine ID HH assigned to key-7. As such, transactions 1, 2 and N are related in that transaction 1 has information common with transaction N, which has information in common with transaction 2. This interrelationship or grouping may be important for purposes of performing further analysis.

Returning to FIG. 4, at 450, a plurality of lists of vertices is created. For instance, list creator 340 creates the lists of vertices. The operation in 130 of flow diagram 100 is analogous to operation 450, and as such the description for 130 is equally applicable for describing operation 450. In particular, for each key, a corresponding list of vertices is created, such that vertices in the corresponding list include information that is associated with the corresponding key. As an example, for key-1 associated with credit card number XX, the list would include transactions that have used credit card number XX, such as transactions 1 and N, and possibly others.

Figure 5B:
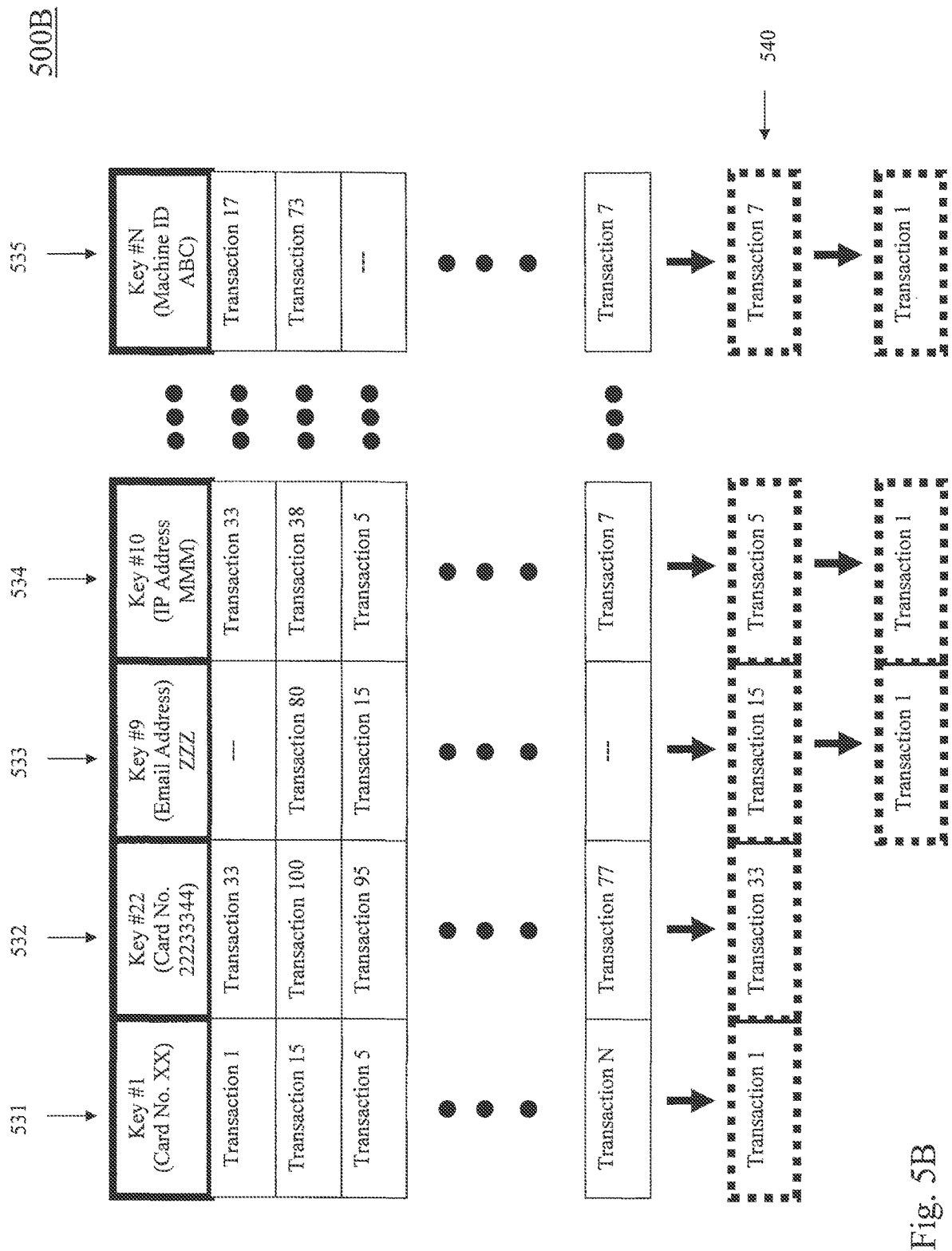
FIG. 5B is an illustration of a plurality of lists of vertices as arranged by keys, in accordance with one embodiment of the present invention.

For illustration purposes only, FIG. 5B is an illustration of a table 500B that is a representation of the plurality of lists of vertices as arranged by keys, in accordance with one embodiment of the present invention. It is intended that FIG. 5B is associated with the information provided in FIG. 5A.

As shown in FIG. 5B, each list of vertices (e.g., a column) corresponds to a key. For instance, the information in column 531 corresponds to key-1 assigned to credit card number XX, information in column 532 corresponds to key-22 assigned to credit card number 22233344, information in columns 533 corresponds to key-9 assigned to email address MMM, information in column 534 corresponds to key-10 assigned to IP address MMM, information in column 535 corresponds to key-N assigned to machine ID ABC, etc. Other information related to other keys can be represented in table 500B. Also, the configuration of information in table 500B is provided for illustration, and other embodiments are well suited to creating and storing a plurality of lists of vertices in various configurations.

Each list of vertices (e.g., column) includes vertices that are associated with the corresponding key. That is, those vertices include information that is associated with the corresponding key. For instance, in column 531 associated with key-1, all the vertices (e.g., transactions 1, 5, 15, N, etc.) represent transactions that have used credit card number XX. Similarly, column 532 is associated with key-22 and all the vertices (e.g., 33, 77, and 95) represent transactions that have used credit card number 22233344.

Turning back to FIG. 4, at 460, for a first list of vertices, a least valued index is determined from a group of associated vertices. The group of associated vertices is based on vertices in the first list, and also vertices pointed to by the vertices in the first list, and at the very least includes those vertices. The operation in 460 is analogous to the operation in 140, and the corresponding description is equally applicable to 460. As an example, in table 500B, for the list in column 531 associated with key-1 assigned to credit card number XX, the least valued index is of value one (taken from vertices 1, 5, 15, N, etc.), and that index is associated with transaction-1. Similarly, for the list in column 535 associated with key-N assigned to machine ID ABC, the least valued index is 7, associated with transaction-7. As shown in FIG. 5B, row 540 shows, at least preliminarily, the least valued index taken from the group consisting solely of the vertices in the corresponding list. Row 540 does not take into consideration any vertices that are pointed by the associated vertices.

At 470, all associated vertices are pointed to a root vertex associated with the least valued index. At 480, the most current root vertex is stored in association with all the associated vertices. As described previously, the pointing operation links the associated vertices to other vertices in the graph. In one case, the pointing operation is performed internally on vertices of a particular list of vertices. That is, at least preliminarily, each vertex in the first list of vertices is pointed to a root vertex associated with the least valued index. For instance, in column 531, all the vertices associated with key-1 point to vertex 1. That is, transactions 5, 15, and N each point to vertex 1. Similarly, for column 532, all the associated vertices (e.g., 33, 77, 95, and 100) point to vertex 33. Also, at least preliminarily, for column 533, all associated vertices point to vertex 15, but will eventually point to vertex 1, as will be described below. Further, at least preliminarily, for column 534, all associated vertices point to vertex 5, but will eventually point to vertex 1, as will be described below. And, at least preliminarily, for column 535, all associated vertices point to vertex 7, but will eventually point to vertex 1, as will be described below.

The operations in 460, 470, and 480 are repeated for each of the list of vertices. As the process in flow diagram 400 is performed on each of the plurality of lists of vertices, each vertex in the graph will point downhill to another vertex, the most current root vertex, within the context of the ordered set of vertices. Root vertices do not point downhill, but form the endpoint of link between vertices. Eventually, each vertex will point downhill to a root vertex in a corresponding component of the graph. The least valued index is associated with a vertex in the graph.

As shown in FIG. 5B, the concept of pointing to a related vertex for related transactions between columns in table 500B is illustrated by columns 534 and 535, which both include common information related to transaction 7. That is, the group of associated vertices includes vertices that are pointed to by vertices in the first list, and as such are also pointed to the root vertex. Put another way, the group of associated vertices includes a first chained vertex that is pointed to by the vertex associated with the lowest index of vertices included in the first list and vertices pointed to by the vertices in the first list. For instance, at least preliminarily, column 535 is associated with a least valued index of 7, associated with transaction-7. In addition, column 534 is associated with a least valued index of 5, as provided in row 540, when considering only information in these two columns. Since transaction 7 is common to both keys 10 and N, transaction-7 points to the lowest index provided in both columns 534 and 535, which is 5 (e.g., the chained vertex), associated with transaction-5.

Even further, when considering other processed lists of vertices, as shown in FIG. 5B, in columns 531 and 534 transaction 5 is common to both key-1 and key-10. That is, included in the group of associated vertices is a second chained vertex pointed to by the first chained vertex. As an example, transaction 5 (first chained vertex), from column 531 points downhill to an index of 1 that is associated with transaction-1 (second chained vertex). As a result, associated vertices include transaction-7, which points to index 5 from column 534, transaction-5, which points to index 1 from column 531, and column 1. In addition, the associated vertices includes all vertices in the lists of vertices of column 531 associated with key-1, column 534 associated with key-10, and column 535 associated with key-N. As a result, all of the associated vertices point downhill to the root vertex, transaction-1.

As shown in FIG. 5B, table 500B is in various stages of construction during the performance of the method outlined in flow diagram 400. The values in table 500B, especially the pointed to values for each vertex, or the most current root vertex, will vary depending on how many of the lists of vertices have been processed. That is, at an intermediate stage, not all of the entries are provided with values, nor are the values entered necessarily their final values. As all of the lists of vertices have been processed, each of the vertices will point to the root vertex that is the root of a corresponding component. As such, all vertices that point to the same root vertex is associated with a common component of the graph, and as such those transactions within the component are related. In one embodiment, the index of the root vertex is assigned as a corresponding component value. For instance, in the example provided in FIG. 5B, the root vertex 1 is associated with component-1, and includes all associated vertices included in columns 531, 533, 534, and 535, and possibly other vertices not shown.

FIGS. 5C and 5D are illustrations of look-up-tables (LUTs) that condense the information obtained from component enumeration of a graph. It is intended that FIGS. 5C and 5D are associated with the information provided in FIGS. 5A and 5B.

In particular, FIG. 5C is an illustration of an exemplary LUT 500C providing relationships between a vertex and a corresponding root vertex, in accordance with one embodiment of the present invention. In another embodiment, the information in LUT 500C is included in the ordered set of vertices. As shown in LUT 500C, column 551 lists the vertices in the graph. Each vertex entry is associated with a root index that corresponds to the most current root vertex. Column 552 provides the current root vertex to which a corresponding vertex is pointing. Depending on the stage of completion of the process in FIG. 4, some entries may or may not be populated, and the values in column 552 may or may not be finalized. For instance, the root vertex for vertex 2 has not been processed. As the process in FIG. 4 is completed, the root vertex, for a corresponding vertex in column 551, forms the root vertex for a corresponding component, of the same index number. As such, all associated vertices having the same root vertex is included in that component.

FIG. 5D is an illustration of an exemplary LUT listing associated vertices in a component of a graph, in accordance with one embodiment of the present invention. As shown in LUT 500D, column 561 lists the component index values. That is, components of a graph are indexed in column 561. In one embodiment, the index for a component is the same as the index of its corresponding root vertex. The remaining columns 562, 563, etc. provide associated vertices that correspond to a particular component.

Each row in FIG. 5D contains a list of associated vertices for a corresponding component. For instance, row 571 lists all vertices associated with component-1 that has vertex-1 as its root vertex. As such, for component-1 from FIG. 5B, transactions 1, 5, 7, 15, 17, 73, N, and possibly other values not shown point to transaction-1 as their root vertex, and are included in row 571. Also, row 572 lists vertices associated with component-2. In this case, vertex-2 does not share information with any other vertex. As such, vertex-2 is the only entry for component-2, and is also the root vertex. In addition, row 573 lists vertices associated with component-XX. At present, component-XX includes transactions XX and 900 as related transactions of a component.

Figure 6:
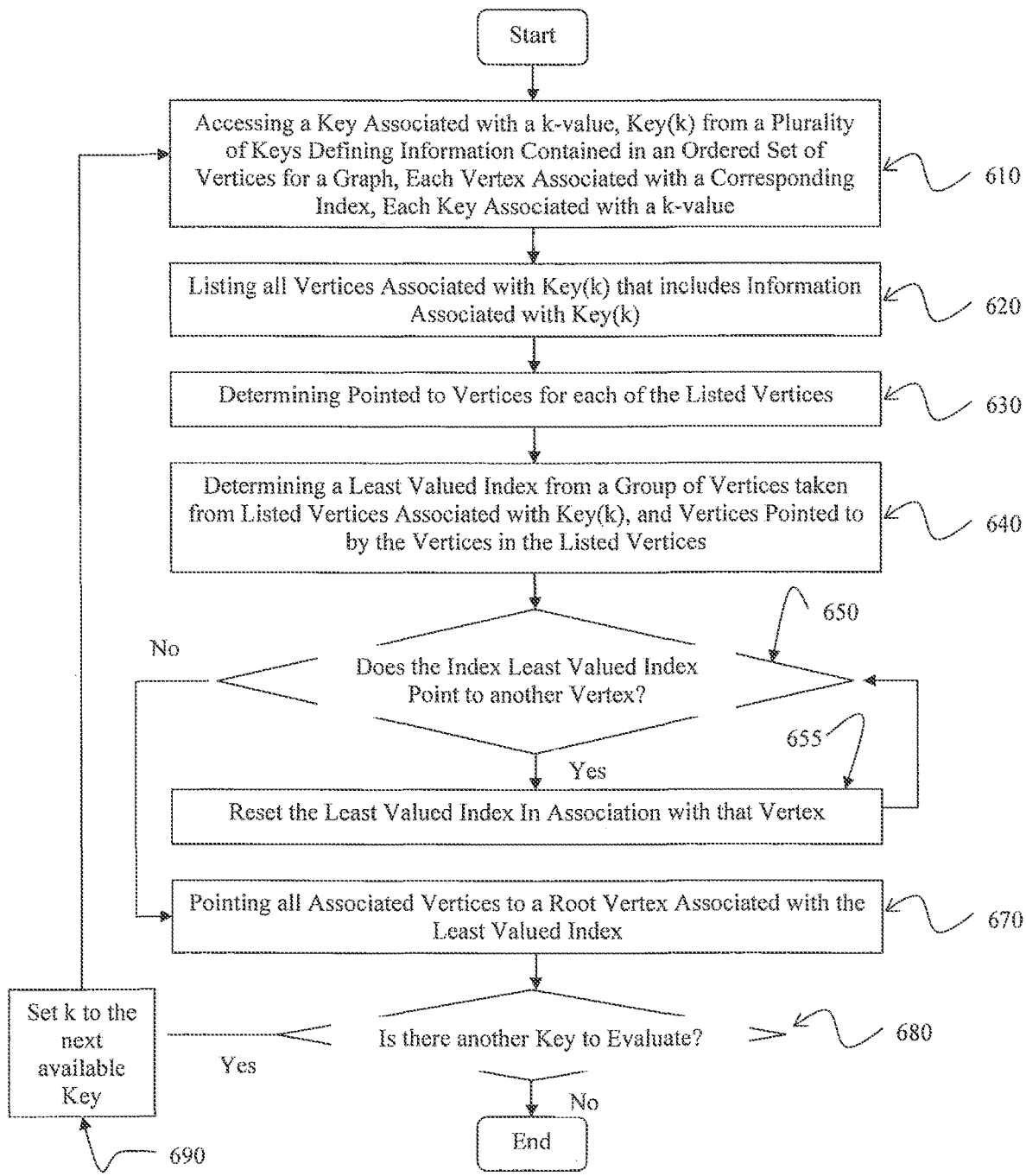
FIG. 6 is a flow diagram illustrating a detailed method for component enumeration, in accordance with one embodiment of the present invention.

FIG. 6 is a flow diagram illustrating steps in method for fast component enumeration of graphs that provides more detail to the implementation of the pointing operations described above, in accordance with one embodiment of the present invention. More particularly, FIG. 6 describes operations 140 and 150 in FIG. 1 and operations 460 and 470 in FIG. 4. Preliminarily, a graph is associated with an ordered set of vertices, each vertex containing information and being associated with a corresponding index. In addition, a plurality of keys is created, wherein each key defines a unique piece of information. Each of the keys being assigned a k-value.

At 610, a key associated with a k-value, Key(k), is accessed from storage. At 620, vertices associated with Key(k) are listed, such that vertices that are listed include information associated with Key(k). At 630, each vertex in the list is cross-referenced to determine if it points to a downhill vertex. For instance, Table 500C is accessed to determine if the corresponding vertex is pointing to a most current root vertex. At 640, a least valued index is determined from the group of associated vertices that is based on and includes the vertices in the list, as well as any vertices to which they point.

The operations at 650 and 655 determine the appropriate least valued index. That is, operations 650 and 655 loop until all associated vertices are considered. Put another way, all chained vertices are considered to determine the least valued index. In particular, decision step 650 considers whether the vertex associated with the least valued index points to another vertex. If so, the least valued index is reset to the index associated with the pointed to vertex. The process returns to 650 and loops until it is determined that the vertex associated with the least valued index does not point to another vertex, and continues to 670.

At 670, all associated vertices are pointed to the root vertex associated with the least valued index. That is, appropriate fields are populated or re-populated in storage (e.g., in the ordered set of vertices, or in Tables 500C and 500D). Associated vertices were previously considered when determining the least valued index. As such, all associated vertices are related in some manner through one or more keys.

At decision step 680, it is determined if there is another key to evaluate. If there is another key, the process sets the k-value to the next available key. Thereafter, the process loops back to 610.

On the other hand, if all keys have been processed, then the method of flow diagram 600 ends. At this point, each vertex in the graph points to a corresponding root vertex. Also, each root vertex also defines a corresponding component of the graph. As such, vertices that point to a common root vertex belong to the same component.

Looking now at the quality of relationships between vertices, within each component of a graph the certainty of each key may diminish over time. As such, for a key that loses its relational certainty, different vertices sharing that key would no longer be related. For example, an IP address is assigned to a particular computing resource accessing the Internet for an indeterminate amount of time. The assignment of an IP address (associated with key-KK) can be transitory, lasting as long as a single Internet session used by a consumer to effect a transaction. When that session ends, that IP address (key-KK) may be assigned to another computing resource of another user. As such, two transactions with the same IP address (key-KK) may not be related even if the transactions are only 100 minutes apart. On the other hand, two transactions using the same card number (associated with key-II) may be related even if they are 100 days apart, since that credit card is associated with the same user.

To compensate for this uncertainty, keys are allowed to expire, in accordance with one embodiment of the present invention. More specifically, a key is allowed to expire after a condition is satisfied, in one embodiment. For instance, a key expires after a predetermined period of time according to a set schedule based upon its corresponding data type. Using the previous example, a key related to an IP address may expire after 30 minutes. Upon expiration, the list of vertices associated with the key is also deleted. However, the effect of deleting the key on the structure of a corresponding component is minimized, since other keys related to that component may provide the necessary relationship between vertices of the component. As such, only vertices and keys related to that component need be reset (repointing vertices and deleting information related to the expired key), instead of resetting all the components and vertices of the entire graph.

In practice a graph may contain millions of vertices, and undergo rapid addition and deletion of (implicit) edges. Historically, repeating such operations while maintaining an orderly, compact data structure has proved difficult, since it requires reanalyzing all the edges of the graph. However, embodiments of the present invention are able to efficiently handle such operations while performing component enumeration. As a result, embodiments of the present invention are able to dramatically improve performance over traditional methods of component enumeration.

A process for component enumeration can be expressed using the following exemplary pseudo code, in accordance with one embodiment of the present invention. In particular, let "V" be the set of vertices ("v") containing information, such as consumer transaction information. Let "G" be the graph that results upon placing an edge between each pair of vertices with a shared key. The present embodiment is able to partition "V" into subsets that correspond to the connected components of "G," without explicitly constructing "G." This is accomplished by implicitly adding edges to "V" using the following pseudo code:

```
For each vertex V
{ For each key K associated with V
    { Add V to list of vertices associated with key K } }
For each key K
{ For each vertex V associated with K
    { Get index of vertex to which it points (if any)
        Note vertex with lowest index
    }
    For each vertex V associated with K
    { Repoint V to vertex with lowest index } }
```

The resulting structure is a forest "F," in which each tree has directed edges pointing toward the root. Each root in a tree of "F" is the vertex of lowest index in a component of "O." Moreover, for each vertex "v" in any connected component of graph "O," the corresponding tree in forest "F" contains a short path from the vertex to the root. By associating each tree with the index of its root vertex, all the connected components of "O" have successfully been labeled.

While the methods of embodiments illustrated in flow diagrams of FIGS. 1, 4 and 6 show specific sequences and quantity of operations, the present invention is suitable to alternative embodiments. For example, not all the operations provided for in the methods presented above are required for the present invention. Furthermore, additional operations can be added to the operations presented in the present embodiments. Likewise the sequences of operations can be modified depending upon the application.

A method and system for fast enumeration of components of a graph is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed:

1. A computer-implemented method comprising:
    accessing a graph for a set of data records, each data record represented as a vertex in the graph, each data record comprising one or more data elements;
    creating a list of vertices comprising a plurality of vertices in the graph, wherein each of the plurality of vertices is associated with a key representing a unique value of a data element in the one or more data elements and is assigned an index;
    determining a vertex having a least-valued index in one or more of the list of vertices or vertices of the graph pointed to by the vertices in the list; and
    associating the plurality of vertices in the list with the vertex having the least-valued index, wherein the list of vertices and a second list of vertices of the graph that is associated with the vertex having the least-valued index belong to a same connected component of the graph.

2. The method of claim 1, further comprising:
    receiving, from a corresponding source, each data record.

3. The method of claim 1,
    wherein the vertices in the graph form an ordered set of vertices indicated by the respective indices of the vertices.

4. The method of claim 3, wherein each data record is a customer transaction.

5. The method of claim 4, wherein the ordered set of vertices is ordered based on when the customer transaction occurred, when the customer transaction was received, or when the customer transaction completed processing.

6. The method of claim 1, wherein a list vertex is associated with the least-valued index, the method further comprising:
    responsive to determining the list vertex points to another vertex in a chain of pointed to vertices, adjusting the least-valued index to a lowest index in the chain of pointed to vertices.

7. The method of claim 1, further comprising:
    deleting a list of vertices that share a key that expired under a predetermined condition, the predetermined condition comprising whether a period of time has expired.

8. The method of claim 1, further comprising:
    deleting a vertex in the graph responsive to the vertex being expired under a predetermined condition, the predetermined condition comprising whether a period of time has expired.

9. The method of claim 8, further comprising:
    responsive to the expired vertex being a root vertex that points to itself, determining a new root vertex for one or more lists associated with the expired vertex.

10. A non-transitory computer-readable storage medium storing executable computer program instructions, the computer program instructions comprising instructions for:
    accessing a graph for a set of data records, each data record represented as a vertex in the graph, each data record comprising one or more data elements;
    creating a list of vertices comprising a plurality of vertices in the graph, wherein each of the plurality of vertices is associated with a key representing a unique value of a data element in the one or more data elements and is assigned an index;
    determining a vertex having a least-valued index in one or more of the list of vertices or vertices of the graph pointed to by the vertices in the list; and
    associating the plurality of vertices in the list with the vertex having the least-valued index, wherein the list of vertices and a second list of vertices of the graph that is associated with the vertex having the least-valued index belong to a same connected component of the graph.

11. The non-transitory computer-readable storage medium of claim 10, further comprising instructions for:
receiving, from a corresponding source, each data record.

12. The non-transitory computer-readable storage medium of claim 10, wherein the vertices in the graph form an ordered set of vertices indicated by the respective indices of the vertices.

13. The non-transitory computer-readable storage medium of claim 12, wherein each data record is a customer transaction.

14. The non-transitory computer-readable storage medium of claim 13, wherein the ordered set of vertices is ordered based on when the customer transaction occurred, when the customer transaction was received, or when the customer transaction completed processing.

15. The non-transitory computer-readable storage medium of claim 10, wherein a list vertex is associated with the least-valued index, further comprising instructions for:
responsive to determining the list vertex points to another vertex in a chain of pointed to vertices, adjusting the least-valued index to a lowest index in the chain of pointed to vertices.

16. The non-transitory computer-readable storage medium of claim 10, further comprising instructions for:
deleting a list of vertices that share a key that expired under a predetermined condition, the predetermined condition comprising whether a period of time has expired.

17. The non-transitory computer-readable storage medium of claim 10, further comprising instructions for:
deleting a vertex in the graph responsive to the vertex being expired under a predetermined condition, the predetermined condition comprising whether a period of time has expired.

18. The non-transitory computer-readable storage medium of claim 17, further comprising instructions for:
responsive to the expired vertex being a root vertex that points to itself, determining a new root vertex for one or more lists associated with the expired vertex.

19. A system, comprising:
a processor; and
a non-transitory computer-readable storage medium storing executable computer program instructions, wherein the computer program instructions, when executed, cause the processor to perform operations comprising:
accessing a graph for a set of data records, each data record represented as a vertex in the graph, each data record comprising one or more data elements;
creating a list of vertices comprising a plurality of vertices in the graph, wherein each of the plurality of vertices is associated with a key representing a unique value of a data element in the one or more data elements and is assigned an index;
determining a vertex having a least-valued index in one or more of the list of vertices or vertices of the graph pointed to by the vertices in the list; and
associating the plurality of vertices in the list with the vertex having the least-valued index, wherein the list of vertices and a second list of vertices of the graph that is associated with the vertex having the least-valued index belong to a same connected component of the graph.

20. The system of claim 19, wherein each data record is a customer transaction.

* * * * *